United States Patent [19]

Visger et al.

[11] 4,341,875
[45] Jul. 27, 1982

[54] HIGH FLEXURAL MODULUS REACTION INJECTION MOLDED URETHANES

[75] Inventors: Robert L. Visger, Madison; Mark A. Plano, East Haven, both of Conn.

[73] Assignee: Olin Corporation, New Haven, Conn.

[21] Appl. No.: 100,594

[22] Filed: Dec. 5, 1979

[51] Int. Cl.³ .................... C08G 18/14; C08G 18/32; C08G 18/48
[52] U.S. Cl. .................... 521/164; 521/126; 521/129; 521/160; 521/167; 521/175; 521/914; 264/328.1; 264/331.19; 264/53
[58] Field of Search ............... 521/126, 129, 160, 167, 521/914, 175, 176

[56] References Cited

U.S. PATENT DOCUMENTS

| | | | |
|---|---|---|---|
| 3,476,933 | 11/1969 | Mendelsohn | 260/2.5 |
| 4,048,105 | 9/1977 | Salisbury | 260/2.5 AC |
| 4,055,548 | 10/1977 | Carleton et al. | 260/77.5 AT |
| 4,076,695 | 2/1978 | Keil | 260/77.5 AM |
| 4,126,742 | 11/1978 | Carleton et al. | 528/57 |
| 4,190,711 | 2/1980 | Zdrahala et al. | 521/112 |

OTHER PUBLICATIONS

Exparte Fred Lister et al., Decision of the Board of Appeals in U.S. Pat. No. 3,296,179, Apr. 12, 1966.
Exparte Wallace Karl Bingham et al., Decision of the Board of Appeals in U.S. Pat. No. 3,527,729, Nov. 14, 1969.

Primary Examiner—H. S. Cockeram
Attorney, Agent, or Firm—William D. Sabo; Thomas P. O'Day

[57] ABSTRACT

A two-part liquid composition capable of being mixed with a foaming agent and placed in a reaction injection molding apparatus to form a microcellular composition, which when cured yields a urethane product having improved flexural modulus properties. The composition is comprised of a part "A" which is comprised of an organic isocyanate, and a part "B" which is comprised of a base polyol, a catalyst, and a chain extending agent mixture comprised of a glycol and at least one high functionality supplemental polyol.

18 Claims, No Drawings

HIGH FLEXURAL MODULUS REACTION INJECTION MOLDED URETHANES

This invention relates to urethane elastomeric compositions which when cured yield products having high flexural modulus values (that is greater than about 100,000 pounds force per inch square measured at room temperature (about 75° F.)) hereafter termed "high flexural modulus" urethane products and other products having low flexural modulus properties (that is a flexural modulus less than about 100,000 pounds force per inch square measured at room temperature (about 75° F.) hereafter termed "low flexural modulus" urethane products. Products which have flexural modulus properties in the range from about 50,000 pounds force per inch square to about 100,000 pounds force per inch square measured at room temperature are hereafter termed "intermediate flexural modulus" products. High, intermediate, and low flexural modulus urethane products are employed as automotive parts. For example, high flexural modulus urethane products are employed as exterior automobile parts such as front and rear end extensions (spoilers). Low flexural modulus urethane products are typically employed as full fascia automotive front and rear ends.

More particularly, this invention relates to the use of a high functionality supplemental polyol in cooperation with a glycol as a chain extending agent mixture in a two-part liquid composition capable of being mixed in a reaction injection molding apparatus to form microcellular urethane elastomeric compositions. The term "reaction injection molding apparatus" is employed throughout the description and claims as comprising reactant mixing systems and associated piping and pumps, metering and monitoring equipment, pressure type impingement mixing head, and associated mold. The term "high functionality supplemental polyol" is employed throughout the description and claims to mean aliphatic polyester polyols, aliphatic polyether polyols, and mixtures thereof having an average molecular weight in the range from about 250 to about 1,600 and preferably from about 300 to about 1,550 and having an average functionality of at least about 3. Most particularly, this invention relates to the use of a high functionality supplemental polyol in conjunction with ethylene glycol in chain extending mixture in a two-part liquid composition capable of being mixed in a reaction injection molding apparatus to form a urethane elastomeric composition.

Urethane elastomeric compositions are generally prepared in a reaction injection molding system which is a process for forming polymeric products from highly reactive chemicals employing high pressure impingement mixing machines. Reaction injection molding processes are typically employed in manufacturing automobile impact systems by injecting two-part liquid compositions directly into a mold where components within the compositions react, cure and foam to form an article of the desired shape.

Elastomers employed in reaction injection molding compositions are believed to comprise blocks of reactants linked together to form a chain. Reactants such as base polyols, chain extenders, and catalysts are joined by other reactants such as organic isocyanates to form urethane block polymer chains. The polyol segment of the block polymer is typically called the "soft segment" while the isocyanate/chain extender block is typically called the "hard segment". The use of different diols and triols as base polyols in reaction injection molding formulations is well known. It is also known that the isocyanate blocks can be modified by adding chain extending agents or cross-linkers thereto. In the past, 1,4-butane diol and ethylene glycol have been widely used solely and in combination as chain extending agents in reaction injection molding compositions to enhance the flexural modulus properties. Without being bound by theory, it is believed that the chain extending agents or cross-linkers join with the isocyanates to form blocks which are relatively harder and stiffer than the relatively softer polyol segments. The "hard segment" comprises short blocks of isocyanate and an extender reacted to form a chain having less flexibility than the soft polyol segment and is generally incompatible with the soft segment. For this reason, it is believed that soft and hard segments tend to phase separate upon cure. As a result of this, the hard segments act as tie down or cross-link points for the soft flexible polyether segments which in turn leads to an improvement in physical properties such as flexural modulus of the cured reaction injection molded product.

The flexural modulus property of a cured urethane elastomeric composition is a measure of the resistance of the cured composition to bending or flexing. The relationship between the value of flexural modulus and temperature at which it is measured is about the same for high flexural modulus urethane products as for low flexural modulus urethane products. Typically, the flexural modulus is nearly linear but varies inversely with temperature. The flexural modulus has a relatively low value at a high temperature (about 158° F.), an intermediate value at about room temperature (about 75° F.), and a higher value at a low temperature (about −20° F.). At high temperatures, significant heat sag occurs with low flexural modulus values and at low temperatures, embrittlement and breakage problems are typically associated with relatively high flexural modulus properties.

Throughout the description and claims, the term "flexural modulus ratio" is defined as the quotient of the flexural modulus measured at high temperature divided into the value of the flexural modulus measured at low temperature of the cured urethane product of this invention. The flexural modulus ratio is in effect a slope of a plot of flexural modulus values as a function of temperature at which it is measured. In final cured product applications, it is highly desirable to achieve a cured product which has a low flexural modulus ratio for both high flexural modulus urethane products and for low flexural modulus urethane products because of final product processing characteristics. For example, for high flexural modulus urethane cured products, a flexural modulus ratio in the range from about 1 to about 15 is preferred. For low flexural modulus urethane cured products, the preferred flexural modulus ratio is in the range from about 1.0 to about 3.25. In effect, a slope of a part of flexural modulus as a function of temperature approaching about 1 is highly desirable for cured products having high, intermediate and low flexural modulus properties.

The prior art has recognized the use of increased amounts of 1,4-butane diol or ethylene glycol and isocyanate to improve the flexural modulus properties of cured urethane products. The use of increased amounts of expensive isocyanate has led to a more expensive cured product while the use of 1,4-butane diol has not yielded a significant improvement in the flexural modulus properties. Efforts to improve the flexural modulus property by increasing the amount of ethylene glycol as a chain extending agent in reaction injection molding compositions is limited, since higher levels of ethylene glycol employed in reaction injection molding compositions typically leads to processing difficulties such as a cheezing of the composition.

There is need therefor for an improved reaction injection molding composition which has a higher (increased) flexural modulus at a high temperature (about 158° F.), a higher (increased) flexural modulus at room temperature (about 75° F.), and a relatively low flexural modulus at a low temperature (about −20° F.) which are achieved in the cured urethane product with only minimum increased amounts of isocyanate and/or ethylene glycol. There is need therefor for an improved reaction injection molding composition which when cured yields a urethane product which has a low flexural modulus ratio (or slope of flexural modulus versus temperature) with only minimum increased amounts of isocyanate and/or ethylene glycol.

OBJECTS

It is a primary object of this invention to provide an improved two-part reaction injection molding composition, which when reacted and cured, has a higher flexural modulus at about 158° F., a higher flexural modulus at about 75° F. and yet a relatively low flexural modulus at about −20° F. than prior art compositions per given weight of isocyanate.

It is a further object of this invention to provide an improved reaction injection molding composition which when cured has a low numerical ratio of flexural modulus at about −20° F. to a flexural modulus at about 158° F.

It is still a further object of this invention to improve the flexural modulus of reaction injection molding compositions by employing selected high functionality polyols admixed with glycols as chain extenders thereby minimizing the amount of isocyanate and ethylene glycol employed in improving the flexural modulus properties of reaction injection molding compositions.

Yet another object of this invention is to provide an improved reaction injection molding composition which has improved processing characteristics.

BRIEF DESCRIPTION OF THE INVENTION

The foregoing objects of the invention are achieved in a foamable liquid composition capable of yielding when cured a microcellular urethane product having improved flexural modulus properties, said composition comprising of:
(1) part "A" comprising an organic isocyanate, and
(2) part "B" comprising
(a) a base polyol having
(i) an equivalent weight in the range from about 1,800 to about 7,000 and
(ii) an average functionality in the range from about 2 to about 4,
(b) a chain extending agent mixture comprising
(i) a glycol and
(ii) at least one high functionality supplemental polyol having an average molecular weight in the range from about 250 to about 1,600 and an average functionality of at least about 3,
(c) a catalyst and
(d) a foaming agent and wherein the stoichiometric equivalent weight of said organic isocyanate to said base polyol of said part "B" is in the range from about 95 to about 125, the amount of said chain extending agent mixture employed in said part "B" is in the range from about 12 to about 40 parts per 100 parts of said part "B", and wherein the amount of said high functionality supplemental polyol employed in said chain extending agent mixture of said part "B" is at least about 2 parts per 100 parts of part "B".

DETAILED DESCRIPTION OF THE INVENTION

Urethane elastomeric precure compositions and in particular reaction injection molding system precure compositions are typically described as two-part systems which are usually identified as part "A" and part "B".

The part "A" and part "B" nomenclature system is widely employed in the art and is employed throughout the specification for convenience to accurately describe precure compositions.

In the process of this invention, part "A" comprises an isocyanate and mixtures of various isocyanates. The isocyanate reactant is typically an organic isocyanate conventionally employed in polyurethane production, including mixtures containing one or more organic diisocyanates and organic polymeric isocyanates.

Typical organic diisocyanates employed as part "A" in this composition include toluene diisocyanate, the 80:20 or the 65:35 isomer mixture of the 2,4- and 2,6-isomeric forms, ethylene diisocyanate, propylene diisocyanate, xylene diisocyanate, 3,3'-bitoluene-4,4'-diisocyanate, hexamethylene diisocyanate, naphthalene 1,5-diisocyanate, 4,4'-methylene diphenylene diisocyanate, and mixtures thereof.

Other suitable organic diisocyanates include adducts and prepolymers prepared from base isocyanates. Suitable examples include 4,4'-methyl diphenyldiisocyanate adducts sold under the registered trademark ISONATE by Upjohn Company.

Preferred organic diisocyanates include ISONATE 181 which contains diphenylmethane diisocyanate and difunctional adducts, ISONATE 191 which is a modified diphenylmethane diisocyanate believed to have an average functionality of about 2.4 and ISONATE 143L which contains 4,4'-methyl diphenyldiisocyanate and adducts of 4,4'-methyl diphenyldiisocyanate having carbodiimide linkages. ISONATE 181, ISONATE 191 and ISONATE 143L are all commercially available from The Upjohn Company.

Crude isocyanate may also be employed as part "A" of the composition, such as crude toluene diisocyanate prepared by the phosgenation of a mixture of toluene diamines, or crude diphenylmethane isocyanate prepared by the phosgenation of crude diphenylmethylamine.

Polymeric polyisocyanates may also be employed as part "A" in the process of this invention. Illustrative of such materials are those described in U.S. Pat. Nos. 2,683,370, which issued July 13, 1954 to Seeger et al, and 3,341,363, which issued to Gemeinhardt on Sept. 12, 1967. The entire disclosure of these two patents are incorporated herein by reference.

Typical polymeric polyisocyanates are those represented by Formula I below wherein n is a number from 0 to 5, and R is hydrogen or lower alkyl (i.e., containing 1–4 carbons):

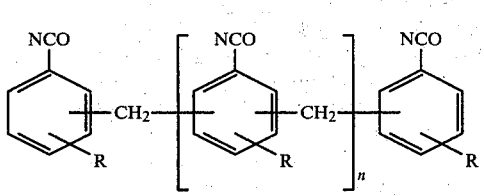

I

The preferred polymeric isocyanates are the polymethylene polyphenylisocyanates such as can be purchased commercially for use in polyurethane foam production. These are mixtures containing one or more polyisocyanates as represented by Formula I above wherein R is hydrogen. Especially preferred polymethylene polyphenylisocyanates are those which have an average NCO functionality ranging from about 2.1 to about 3.5. It is to be understood that, as used in the specification and claims herein, the terms "polymeric polyisocyanate" and "polymethylene polyphenylisocyanate" are intended to include mixtures containing one or more such polyisocyanates. Typical polymeric isocyanates include polyphenylene polymethyleneisocyanate, m-phenylene diisocyanate, oxy bis-(4-phenylisocyanate), 4,4'-diisocyanato-3,3'-dimethyl diphenyl, ethylenebis-(4-phenylisocyanate), isopropylenebis-(4-phenylisocyanate), p-phenyl diisocyanate, 4,4'-diisocyanato diphenyl, the like and mixtures thereof.

Part "B" is comprised of the base polyol, a chain extending agent mixture, and a catalyst. Several polyols or mixtures thereof may be employed as the base polyol. The term "base polyol" is defined throughout the specification and claims to mean the major polyol component, typically in the range from about 60 to about 80 parts per 100 total parts of part "A" and part "B". Typical base polyols include (1) aliphatic polyester polyols, (2) aliphatic polyether polyols, (3) aromatic polyether polyols, (4) aromatic grafted polyols and (5) aliphatic grafted polyols such as polymer polyols described in U.S. Pat. No. 4,153,643, issued to Frank J. Preston et al on May 8, 1979, the disclosure of which is incorporated herein in its entirety by reference.

The base polyol has an average functionality in the range from about 1 to about 4 and preferably from about 2 to about 3. The hydroxyl number is in the range from about 10 to about 125 and preferably from about 15 to about 115. Both linear and branched chain polyols may be employed as base polyols.

Preferred aliphatic polyol reactants employed as the base polyol in part "B" of the composition of this invention are selected from aliphatic polyester polyols, aliphatic polyether polyols, and mixtures thereof. The aliphatic polyols can be any such compound or may be mixtures of two or more such compounds. The polyol or mixtures of polyols should have an average equivalent weight in the range from about 1,800 to about 7,000, preferably from about 2,000 to about 5,000, and most preferably from about 2,500 to about 4,000.

The aliphatic polyester polyols include the products of reacting polycarboxylic acids with polyhydric alcohols. Illustrative polycarboxylic acids include, for example, oxalic, malonic, succinic, glutaric, adipic, pimelic, suberic, azelaic acid, and the like. Illustrative polyhydric alcohols include various diols, triols, tetrols and higher functionality alcohol, such as ethylene glycol, 1,3-propylene glycol, 1,2-propylene glycol, butylene glycols, butane diols, pentane diols, glycerol, trimethylolpropane, trimethylolhexane, pentaerythritol, sorbitol, hexane 1,2,6-triol, 2-methyl glucoside, mixtures thereof and the like.

Aliphatic polyether polyols and mixtures thereof characterized as being hydroxy-terminated and having from 0 to about 90 percent primary hydroxyl groups are the most preferred base polyol reactant.

Suitable aliphatic polyether polyols include various polyoxyalkylene polyols and mixtures thereof. Polyether polyols can be prepared, according to well-known methods, by condensing an alkylene oxide, or a mixture of alkylene oxides, using random or step-wise addition, with a polyhydric initiator or mixture of initiators. Illustrative alkylene oxides include ethylene oxide, propylene oxide, butylene oxide, amylene oxide, aralkylene oxides such as styrene oxide, and the halogenated alkylene oxides such as trichlorobutylene oxide and so forth. The most preferred alkylene oxide is propylene oxide or a mixture thereof with ethylene oxide using random or step-wise oxyalkylation.

The polyhydric initiators used in preparing the aliphatic polyether polyol reactant include (a) aliphatic diols such as ethylene glycol, 1,3-propylene glycol, 1,2-propylene glycol, butylene glycols, butane diols, pentane diols, and the like, (b) the aliphatic triols such as glycerol, trimethylolpropane, triethylolpropane, trimethylolhexane, and the like, (c) higher functionality alcohols such as sorbitol, pentaerythritol, methyl glucoside, and the like, (d) the polyamines such as tetraethylene diamine and (e) the alkanolamines such as diethanolamine, triethanolamine and the like.

A preferred group of polyhydric initiators for use in preparing the aliphatic polyether polyol reactant is one which comprises aliphatic diols and aliphatic triols such as ethylene glycol, propylene glycol, glycerol, trimethylolpropane and the like.

The alkylene oxide-polyhydric initiator condensation reaction is preferably carried out in the presence of an alkali metal hydroxide catalyst such as KOH as is well known in the art. In effecting the reaction, a sufficient proportion of alkylene oxide is used as to provide a final polyol product having an equivalent weight from about 1,800 to about 7,000 and preferably from about 2,000 to about 5,000. The catalyst is thereafter preferably removed, leaving an aliphatic polyether polyol which is ready for use in preparing the composition of this invention.

Other polyether and polyester polyols which may be employed in the process of this invention include those enumerated in U.S. Pat. No. 4,098,731, issued to Wulf von Bonin et al on July 4, 1978. The disclosure of that patent is incorporated by reference in its entirety herein.

Part "B" further comprises a chain extending agent mixture comprised of a glycol and at least one high functionality supplemental polyol. Typical glycols include ethylene glycol, propylene, glycol, 1,3-propane diol, meso-2,3-butane diol, the like and mixtures thereof. Ethylene glycol is the preferred polyfunctional glycol and may be prepared by methods well known in the art.

Typical high functionality polyols which may be employed in the chain extending agent mixture of the process of this invention included those polyols having an average equivalent weight in the range from about 250 to about 525, preferably from about 300 to about 510 and having an average functionality of at least about 3. Such polyols include aliphatic polyester polyols, aliphatic polyether polyols, and mixtures thereof. Typical high functionality polyols include sucrose amine polyols prepared from a co-initiator mixture of about 1 mole sugar such as sucrose and from about 2 to about 6 moles of an amine.

Typical amines include mono-, di- and triethanolamine, mono-, di- and triisopropanolamine, triisobutanolamine prepared by reacting ammonia with the corresponding alkylene oxide, N-alkyl-alkanolamines such as N-methyl-diethanolamine and N-ethyl-diethanolamine, lower aliphatic monoalkylamines and dialkylamines, cycloalkylamines, aralkylamines, alkylene diamines such as ethylene diamine and polyalkylene polyamines such as diethylene triamine and triethylene tetraamine.

The sucrose amine polyols are prepared by oxyalkylating the co-initiator mixture, under substantially anhydrous conditions and in the presence of an alkali metal catalyst such as KOH, first with propylene oxide and finally with ethylene oxide. The level of propylene oxide employed is such as to provide an intermediate hydroxyl number within the range of from about 550 to about 700 (equivalent to about 1 mole propylene oxide per OH group in the mixture); and the level of ethylene oxide is about 10 to about 20 percent by weight to total alkylene oxide. The final sucrose amine polyol product is characterized by a hydroxyl number ranging from about 450 to about 650, an absence of free amino groups and has more than about 1 mole of propylene oxide per active hydrogen in the sucrose and amine.

A preferred sucrose amine polyol is comprised of sucrose and diethanolamine and has a hydroxyl number in the range from about 450 to about 650.

Other preferred high functionality polyols include those comprised of sucrose/diethanolamine/glycerin and having a hydroxyl number of about 351 sold commercially by Olin Corporation under the registered trademark Poly-G ® 71-351.

Other sucrose amine polyols which may be employed in the process of this invention also include those described in U.S. Pat. Nos. 3,153,002 and 3,222,357, issued to Marco Wismer et al on Oct. 13, 1964 and Dec. 7, 1965, respectively; U.S. Pat. No. 3,865,806, issued to Louis Robert Knodel on Feb. 11, 1975 and U.S. Pat. No. 3,446,848, issued to Roxburgh Richmond Aitken et al on May 27, 1969. The disclosures of these patents are incorporated herein in their entirety by reference.

Still other high functionality polyols includes (1) high functionality polyols prepared from a co-initiator mixture of dextrose and glycerin typically wih a BF3 catalyst. These co-initiated dextrose/glycerin mixtures are thereafter capped with propylene oxide and typically have a hydroxyl number in the range from about 300 to about 600 and preferably from about 350 to about 550. The average functionality is in the range from about 4 to about 5. Typically, about 2 to about 4 moles of dextrose are employed per mole of glycerin, and (2) high functionality polyols prepared from a co-initiator mixture of sucrose and glycerin typically catalyzed with an alkali metal hydroxide catalyst such as potassium hydroxide. The co-initiator dextrose/glycerin mixture after reacting is capped with ethylene oxide or propylene oxide or mixtures of both. The rigid polyol product has a hydroxyl number in the range from about 300 to about 600 and preferably from about 350 to about 550. The average functionality is in the range from about 4 to about 5. Typically, about 1 mole of sucrose is employed per about 4 moles glycerin in the co-initiator mixture:

Another high functionality polyol type which may be employed includes propylene oxide based triols such as glycerin which are capped with ethylene oxide to provide greater than about 60 percent primary hydroxyl groups. The average molecular weight is in the range from about 1,400 to about 1,500 and the triol is capped in the presence of an alkali metal hydroxide catalyst such as KOH, with about 9 moles ethylene oxide. The average functionality is in the range from about 2 to about 4. At least 15 to 35 parts of chain extending agent mixture may be employed in the process of this invention.

In high flexural modulus reaction injection molding compositions, the concentration of chain extending agent mixture comprised of glycol and at least one high functionality supplemental polyol is in the range from about 23 to about 35 parts chain extending agent mixture per 100 parts of part "B". At least about 5 parts high functionality polyol per 100 parts of part "B" is included in the chain extending agent mixture. In low flexural modulus reaction injecting molding compositions, about 10 to about 22 parts chain extending agent mixture is employed per 100 parts of part "B". At least about 2 to about 5 parts high functionality polyol per 100 parts of part "B" is included in the chain extending agent mixture with the glycol.

At least one and preferably two catalysts are employed as a component of part "B" in the process of this invention for both high flexural modulus and low flexural modulus reaction injection molding compositions. Catalysts are generally added to the "B" part or polyol component of the reaction injection molding composition. Typical catalysts include both tertiary amine catalysts, organic tin catalysts, and combinations thereof.

Typical tertiary amine catalysts include (1) triethylamine, N-methylmorpholine, triethylene diamine, N,N,N'N'-tetramethyl-1,3-butane diamine and mixtures thereof, and (2) tertiary amines containing hydroxyl groups and capable of cross-linking the polyurethane, that is compounds such as those represented by the following general formula:

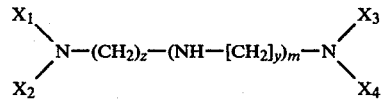

wherein X1, X2, X3 and X4 can be the same or different and are represented by the group, H—(O—alkylene)z in which z is an integer from 1 to 4, the term "alkylene" is defined as divalent aliphatic saturated hydrocarbon radical containing from 1 to 10 carbon atoms, also one of X1, X2, X3 and X4 can be an alkyl group containing up to 20 carbon atoms; n is an integer from 1 to 10, preferably 2 or 3; m is 0 or an integer from 1 to 3; and y is an integer from 1 to 10. Representative of such a class of compounds are tetra (hydroxylethyl) ethylene diamine, tetra (hydroxypropyl) ethylene diamine, the condensation product of propylene oxide and diethylenetriamine.

A preferred tertiary amine catalyst is that sold under the tradename "Dabco 33LV" by Air Products and Chemicals, Inc. This catalyst is believed to comprise about 33 percent triethyleneamine and about 67 percent dipropylene glycol. The amount of tertiary amine catalyst employed is in the range from about 0.01 to about 10 and preferably from about 0.03 to about 4 parts per 100 parts of base polyol. Greater or lesser amounts of tertiary amine catalyst may be employed, if desired.

Typical organic tin catalysts include (1) organo-tin compounds of the general formula:

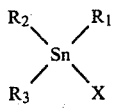

wherein X represents a hydrocarbon alkane radical of from 1 to 18 carbons, $R_1$, $R_2$ and $R_3$ represent a hydrocarbon alkane radical of from 1 to 18 carbons, hydrogen, halogen, or a hydrocarbon acyl group, $R_1$, $R_2$ and $R_3$ being alike or different and further, two members of this group $R_1$, $R_2$ and $R_3$ together being oxygen or sulfur. Representative members of this group of organotin salts include the following specific compounds: tetramethyltin, tetra-n-butyltin, tetra-octyltin, dimethyldioctyltin, triethyltinchloride, dioctyltindichloride, di-n-butyltindichloride, dilauryltindifluoride, 2-ethylhexyltintriiodide, di-n-octyltin oxide, di-n-butyl tin dilaurate, di-n-butyl tin diacetate, di-n-octyltin bis (monobutylmaleate), di-2-ethylhexyltin bis (2-ethylhexanoate), tri-n-butyl tin acetonate, dibutyl tin diacetate, the like and mixtures thereof, and (2) organic tin salts, such as stannous octoate, stannous oleate, and like and mixtures thereof.

A preferred organic tin catalyst is a dibutyltin dilaurate.

The amount of organic tin catalyst employed is in the range from about 0.01 to about 0.20 and preferably from about 0.03 to about 0.15 parts per 100 parts of part "B". Greater or lesser amounts of organic tin catalyst may be employed, if desired.

A mold release agent which is believed to lubricate the mold/part interface may be added to part "B". Typical mold release agents include wax compounds, metal soaps, silicone coatings, internal mold release compounds, the like and mixtures thereof. Wax compounds are the preferred mold release agents. Other suitable mold release agents include those described in U.S. Pat. No. 4,098,731, supra.

The "B" part also includes a suitable blowing or foaming agent. Examples of suitable blowing agents for use in the present invention include dry air, $N_2$, carbon dioxide (produced by the in-situ reaction of water, and polyisocyanate) and certain halogenated aliphatic saturated hydrocarbons such as monofluorotrichloromethane, dichlorodifluoromethane, monochlorotrifluoromethane, 1,1-dichloro-2-fluoroethane, 1,1-difluoroethane, 1,1,2-trichloro-1,2,2-trifluoroethane, the like and mixtures thereof.

Preferred blowing agents (foaming agents) are dry air, $N_2$ and water. The amount of blowing agent employed is in the range from about 1 to about 10 standard cubic feet per hour.

The process of this invention proceeds by individually preparing part "A" and part "B". Generally, the base polyol, the chain extending agent component, catalysts, foaming agent, and mold release agents are admixed together to form a composition of part "B", while the organic isocyanate comprises part "A". Before reaction and cure, both part "A" and part "B" are maintained at a temperature of about 70° to about 160° F. The blowing or foaming agent under pressure is mixed with part "B". Part "B" is fed to a high pressure impingement mixing device. To initiate the reaction, a measured amount of part "A" is well admixed with a measured amount of part "B" in a high pressure (1,500–3,000 psi) impingement mixing device. The achievement of a well-mixed reaction injection molding composition is critical to obtaining improved flexural modulus properties.

The ratio of the measured amount of part "A" to the measured amount of part "B" is related to the index selected for that precure composition.

The term "index" is employed throughout the specification and claims to mean the stoichiometric equivalent weight ratio of isocyanate over base polyol. The index for this invention is in the range from about 95 to about 125 and preferably from about 102 to about 110.

The two-part liquid microcellular composition is shot or injected into a closed mold where reaction, cure, and foaming rapidly ensue. The microcellular composition is allowed to foam in the vented mold and contour form to the interior shape of the mold. After about one minute, the resultant polyurethane foam product is removed from the mold. A minor amount of curing may occur after removal from the mold.

The process of this invention is effective in high flexural modulus reaction injection molding compositions to increase the flexural modulus properties of cured urethane products measured at about 75° F. wherein the base polyol of part "B" is an aliphatic polyether polyol such as that prepared from a triol such as glycerin which is ethylene oxide capped. Typically, such aliphatic polyether polyols have a final molecular weight in the range from about 3,000 to about 7,000; a hydroxyl number in the range from about 25 to about 40; and a primary hydroxyl content in the range from about 70 to about 75 percent. The index is in the range from about 95 to about 125. Such cured products are employed as automotive impact parts. A significant increase in percent elongation also results.

The process of this invention is also effective in high flexural modulus reaction injection molding compositions to increase the flexural modulus property of cured urethane products measured at about 75° F. and at about −20° F. wherein the base polyol of part "B" is an aliphatic polyether diol which has been ethylene oxide and propylene oxide capped. Such aliphatic polyether diol polyols have a molecular weight in the range from about 1,800 to about 4,000; a hydroxyl number in the range from about 25 to about 125; and a primary hydroxyl content in the range from about 70 to about 88 percent. The index is in the range from about 95 to about 125.

The process of this invention is also effective in low flexural modulus reaction injection molding compositions to increase the flexural modulus property of cured urethane products at about 75° F. and at about −20° F. The previously described aliphatic polyether polyols which are ethylene oxide-propylene oxide capped diols are suitably employed as the base polyol of part "B". The index is in the range from about 95 to about 125.

The following examples are presented to define the invention more fully without any intention of being limited. All parts and percentages are by weight unless otherwise specified.

EXAMPLES 1–5

Examples 1–5 illustrate Applicants' invention and are summarized in Table I along with select physical properties measured of cured products.

Examples 1-5 illustrate Applicants' invention employing as a base polyol a 4,000 molecular weight ethylene oxide capped propylene oxide based diol and employing a chain extending agent mixture of ethylene glycol and a sucrose amine polyol.

In Examples 1-5, a part "A" and a part "B" were individually premixed employing the reactants shown in Table I respectively. Part "A" and part "B" were thereafter maintained in separate systems until the reaction was initiated.

A measured portion of part "A" and a measured portion of "B" were reacted in the ratio indicated by the value shown for the index in each example. Part "A" and part "B" were momentarily well admixed at a temperature of about 80° F. and at a pressure of about 2,000 psi in a high pressure impingement mixing head of a reaction injection molding machine. The reaction mixture was thereafter quickly shot from the mixing head into a closed mold where curing was readily effected. About 2 to about 6 standard cubic foot per hour of $N_2$ was employed as a blowing or foaming agent. A measured amount of $N_2$ was pressurized into the part "B" before part "A" and part "B" were admixed. The foamed reaction mixture filled the mold and assumed the shape of inner surface thereof. After about one minute, the mold-formed foam was removed from the mold as a cured polyurethane product. The selected physical properties reported in Table I were determined thereafter.

Reactant and Physical Property Identification List further identifies the reactants and physical property test methods employed in Examples and Comparative Examples which follow.

TABLE I

EXAMPLES 1-5, SUMMARY OF RESULTANT SELECT MEASURED PHYSICAL PROPERTIES OF CURED PRODUCT PREPARED FROM TWO-PART LIQUID MICROCELLULAR COMPOSITIONS

| Examples | 1 | 2 | 3 | 4 | 5 |
|---|---|---|---|---|---|
| Reactants in Part | | | | | |
| Part "A" | | | | | |
| Isonate ® 191[1] | 113.3 | 120 | 129.2 | 132 | 136.2 |
| Part "B" | | | | | |
| Poly-G ® 55-28[2] | 73.5 | 71.3 | 74 | 74 | 74 |
| Ethylene Glycol | 20 | 20 | 23 | 23 | 23 |
| Poly-G ® 71-531[3] | 5 | 7.5 | — | — | 9 |
| Poly-G ® 71-351[4] | — | — | 6 | 9 | — |
| DABCO S25[5] | 2 | 2 | 3.2 | 3.2 | 3.2 |
| DABCO 33LV[6] | — | — | — | — | — |
| DBTDL T12[7] | 0.03 | 0.03 | 0.05 | 0.05 | 0.05 |
| $N_2$, SCFH[8] | 2 | 2 | 6 | 6 | 2 |
| Index | 106 | 106 | 106 | 106 | 106 |
| Cured Product Physical Properties | | | | | |
| Density, pcf[9] | — | — | 63.9 | 64.1 | 63.7 |
| Die C Tear, psi[10] | 614 | 723 | 690 | 742 | 757 |
| Tensile Strength, psi[11] | 3593 | 3783 | 4242 | 4230 | 4389 |
| Elongation, %[12] | 60 | 60 | 80 | 63 | 67 |
| 250° F. Heat Sag[13] | 0.45 | 0.3 | 0.26 | 0.27 | 0.24 |
| Flexural Modulus, kpsi* | | | | | |
| Low Temperature (−20° F.)[14] | 194.2 | 217 | 222.7 | 243.1 | 246 |
| Room Temperature (75° F.)[14] | 104.2 | 118 | 120.1 | 130.6 | 134.7 |
| High Temperature (158° F.)[14] | 64.2 | 78 | 75.7 | 79.5 | 82.8 |
| Flexural Modulus Ratio[15] | 3.02 | 2.79 | 2.94 | 3.06 | 2.97 |

*kpsi means 1,000 pounds per square inch.
[1-15]See Reactant and Physical Property Identification List.

REACTANT AND PHYSICAL PROPERTY IDENTIFICATION LIST

1 A modified diphenylmethane diisocyanate manufactured by The Upjohn Company and believed to have an average functionality of about 2.4.

2 About a 4,000 molecular weight ethylene oxide capped-propylene oxide based diol, hydroxyl number of about 28, from Olin Corporation.

3 A sucrose diethanolamine ethylene oxide-propylene oxide capped polyol, hydroxyl number of about 531, from Olin Corporation.

4 A sucrose diethanolamine glycerin polyol, hydroxyl number of about 351, from Olin Corporation.

5 A tertiary amine catalyst believed to comprise about 25 percent triethylene diamine and about 75 percent 1,4-butane diol, from Air Products and Chemicals, Inc.

6 A tertiary amine catalyst believed to comprise about 33 percent triethylene diamine and about 67 percent dipropylene glycol, from Air Products and Chemicals, Inc.

7 A dibutyltin dilaurate catalyst, from M&T Chemicals, Inc.

8 Standard cubic feet per hour.

9 Pounds per cubic foot.

10 Die C Tear Strength, pounds per linear inch per ASTM 1564-64.

11 Tensile Strength, psi per ASTM 1564-64.

12 Elongation, percent per ASTM 1564-64.

13 A measure of the heat sag in inches, conditions one hour at 250° F., 4-inch overhang.

14 kpsi, per ASTM D-790.

15 Numerical ratio of the value of flexural modulus at about −20° F. over the value of flexural modulus at about 158° F.

NOTE: Poly-G ® is a registered trademark of Olin Corporation.

COMPARATIVE EXAMPLES A-C

Comparative Examples A-C illustrate reaction injection molding compositions of the prior art and select measured physical properties of cured products prepared therefrom. The procedure employed in preparing Comparative Examples A-C was about the same as for Examples 1-5. Comparative Examples A-C illustrate the prior art processes employing a 4,000 molecular weight ethylene oxide capped propylene oxide based diol as the base polyol with ethylene glycol as the sole chain extending agent. Reactants and product properties of the products produced in these Comparative Examples are shown in Table II.

TABLE II

COMPARATIVE EXAMPLES A-C, SUMMARY OF RESULTANT SELECT MEASURED PHYSICAL PROPERTIES OF CURED PRODUCT PREPARED FROM PRIOR ART COMPOSITIONS

| Comparative Examples | A | B | C |
|---|---|---|---|
| Reactants in Part | | | |
| Part "A" | | | |
| Isonate ® 191[1] | 107.5 | 114.7 | 122.9 |
| Part "B" | | | |
| Poly-G ® 55-28[2] | 78.7 | 77.3 | 77 |
| Ethylene Glycol | 21.3 | 22.7 | 23 |
| Poly-G ® 71-531[3] | — | — | — |
| Poly-G ® 71-351[4] | — | — | — |
| DABCO S25[5] | — | — | 2.8 |
| DABCO 33LV[6] | 0.8 | 0.8 | — |
| DBTDL T12[7] | 0.03 | 0.03 | 0.05 |

TABLE II-continued
COMPARATIVE EXAMPLES A-C, SUMMARY OF
RESULTANT SELECT MEASURED PHYSICAL
PROPERTIES OF CURED PRODUCT PREPARED FROM
PRIOR ART COMPOSITIONS

| Comparative Examples | A | B | C |
|---|---|---|---|
| $N_2$, SCFH[8] | 2 | 2 | 2 |
| Index | 106 | 106 | 106 |
| Cured Product Physical Properties | | | |
| Density, pcf[9] | 64.5 | 63.5 | 60.6 |
| Die C Tear, psi[10] | 682 | 709 | 686 |
| Tensile Strength, psi[11] | 3902 | 3872 | 4031 |
| Elongation, %[12] | 127 | 103 | 110 |
| 250° F. Heat Sag[13] | 0.2 | 0.13 | 0.17 |
| Flexural Modulus, kpsi* | | | |
| Low Temperature (−20° F.)[14] | 178 | 187.6 | 216.6 |
| Room Temperature (75° F.)[14] | 83.7 | 97.2 | 110.6 |
| High Temperature (158° F.)[14] | 47.9 | 58 | 60.1 |
| Flexural Modulus Ratio[15] | 3.6 | 3.3 | 3.6 |

*kpsi means 1,000 pounds per square inch.
[1-15]See Reactant and Physical Property Identification List.

A comparison of the select measured physical properties of Examples 1-5 with those of Comparative Examples A-C indicates a significant improvement in room temperature flexural modulus of about 20,000 psi increase at an index in the range from about 102 to about 110 when employing at least about 5 parts high functionality polyol as a chain extender along with ethylene glycol. The high temperature flexural modulus is also improved and is at least about 4,000 to about 14,900 psi greater. For all examples (1-5), the numerical ratio of low temperature (−20° F.) flexural modulus to high temperature (158° F.) flexural modulus has also been improved (e.g., decreased) from about 2.79 to about 3.06 whereas the Comparative Examples were at least 3.3 or greater.

What is claimed is:
1. A foamable liquid composition capable of yielding when cured a microcellular urethane product with improved flexural modulus properties, said composition comprising:
   (A) an organic isocyanate; and
   (B) a mixture which comprises
      (i) a base polyol having
         (a) an equivalent weight in the range from about 1,800 to about 7,000, and
         (b) an average functionality in the range from about 2 to about 4,
      (ii) a chain extending agent comprising
         (a) a glycol, and
         (b) at least one high functionality supplemental polyol having an average molecular weight in the range from about 300 to about 1,550 and an average functionality of at least about 3,
      (iii) a catalyst and
      (iv) a foaming agent; and
wherein the stoichiometric equivalent weight of said organic isocyanate to said base polyol is in the range from about 95 to about 125, the amount of said chain extending agent employed is in the range from about 12 to about 40 parts per 100 parts of said mixture, and the amount of said high functionality supplemental polyol employed in said chain extending agent is at least about 2 parts per 100 parts of said mixture.

2. The composition of claim 1, wherein the amount of said chain extending agent is in the range from about 23 to about 35 parts per 100 parts of said mixture and wherein the amount of said high functionality supplemental polyol employed in said chain extending agent is at least 5 parts per 100 parts of said mixture and said cured product is a high flexural modulus product.

3. The composition of claim 1, wherein the amount of said chain extending agent is in the range from about 10 to about 22 parts per 100 parts of said mixture and wherein the amount of said high functionality supplemental polyol employed in said chain extending agent is in the range from about 2 to about 5 parts per 100 parts of said mixture and said cured product is a high flexural modulus product.

4. The compositions of claims 1, 2, or 3 wherein said base polyol is an aliphatic polyether polyol.

5. A foamable liquid composition capable of yielding when cured a microcellular urethane product with improved flexural modulus properties, said composition comprising:
   (A) an organic isocyanate; and
   (B) a mixture which comprises
      (i) a base polyol having
         (a) an equivalent weight in the range from about 1,800 to about 7,000, and
         (b) an average functionality in the range from about 2 to about 4,
      (ii) a chain extending agent comprising
         (a) a glycol, and
         (b) a high functionality supplemental polyol having an average molecular weight in the range from about 250 to about 1,600 and an average functionality of at least about 3, wherein said high functionality supplemental polyol is a sucrose amine polyol,
      (iii) a catalyst and
      (iv) a foaming agent; and
wherein the stoichiometric equivalent weight of said organic isocyanate to said base polyol is in the range from about 95 to about 125, the amount of said chain extending agent employed is in the range from about 12 to about 40 parts per 100 parts of said mixture, and the amount of said high functionality supplemental polyol employed in said chain extending agent is at least about 2 parts per 100 parts of said mixture.

6. The composition of claim 5, wherein said sucrose amine polyol is prepared from a co-initiator mixture of (a) about one mole sucrose, and (b) about 2 to about 6 moles of diethanolamine oxyalkylated in the presence of KOH catalyst, first with propylene oxide and finally with ethylene oxide.

7. The composition of claim 6, wherein said sucrose amine polyol has a hydroxyl number in the range from about 530 to about 700.

8. The composition of claim 7, wherein said sucrose amine polyol has a hydroxyl number in the range from about 450 to about 650.

9. The composition of claim 8, wherein said sucrose amine polyol is admixed with at least one additional high functionality polyol prepared from a co-initiator mixture of dextrose and glycerin with a $BF_3$ catalyst and thereafter capped with propylene oxide.

10. The composition of claim 9, wherein said additional high functionality polyol has a hydroxyl number in the range from about 300 to about 600 and has an average functionality in the range from about 4 to about 5, and about 2 to about 4 moles of dextrose are employed per mole of glycerin in the co-initiator mixture.

11. The composition of claim 4, wherein said sucrose amine polyol is admixed with at least one additional high functionality polyol prepared from a co-initiator mixture of about 1 mole sucrose and about 4 moles glycerin catalyzed with an alkali metal catalyst and thereafter capped with ethylene oxide or propylene oxide or a mixture of both.

12. The composition of claim 4, wherein said sucrose amine polyol is admixed with at least one additional high functionality polyol prepared from a triol which is capped with about 9 moles ethylene oxide in the presence of an alkali metal catalyst.

13. The composition of claim 12, wherein said additional high functionality polyol has an average functionality in the range from about 2 to about 4 and has an average molecular weight in the range from about 1,400 to about 1,500 and has greater than about 60 percent primary hydroxyl groups.

14. The composition of claim 7, wherein said catalyst includes tertiary amines and organic tin catalysts.

15. The composition of claim 14, wherein said isocyanate contains 4,4'-methylene diphenyldiisocyanate and has an average functionality of about 2.4.

16. The composition of claim 15, wherein said base polyol employed in said mixture is selected from the group consisting of:
 (A) an aliphatic polyether polyol prepared from a triol which is ethylene oxide capped and has a final molecular weight in the range from about 3,000 to about 7,000, a hydroxyl number in the range from about 25 to about 40 and a primary hydroxyl content in the range from about 70 to about 75 percent,
 (B) an aliphatic ethylene oxide propylene oxide capped polyether diol, having a molecular weight in the range from about 1,800 to about 4,000, a hydroxyl number in the range from about 25 to about 125 and a primary hydroxyl content in the range from about 70 to about 88 percent, and
 (C) mixtures of (A) and (B).

17. A process for the production of a microcellular urethane product having improved flexural modulus properties, comprising:
 (A) feeding a foamable liquid composition into a closed mold,
 (B) allowing said liquid composition to foam and cure in said mold, and
 (C) removing the resultant microcellular urethane product from said mold;
and wherein said foamable liquid composition is the composition of claims 1, 2, 3 or 15.

18. The microcellular urethane product prepared by the process of claim 17.

* * * * *